United States Patent
Schaefer

(10) Patent No.: US 6,389,955 B1
(45) Date of Patent: May 21, 2002

(54) PUMP ASSEMBLY FOR A SLIP-CONTROLLED HYDRAULIC BRAKE SYSTEM FOR A VEHICLE

(75) Inventor: Ernst-Dieter Schaefer, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,594

(22) PCT Filed: Sep. 24, 1999

(86) PCT No.: PCT/DE99/03063

§ 371 Date: Nov. 3, 2000

§ 102(e) Date: Nov. 3, 2000

(87) PCT Pub. No.: WO00/46503

PCT Pub. Date: Aug. 10, 2000

(30) Foreign Application Priority Data

Feb. 6, 1999 (DE) .......................... 199 04 926

(51) Int. Cl.[7] .............. F01B 31/00; F16J 15/18

(52) U.S. Cl. ............................. 92/86; 277/514
(58) Field of Search ................ 92/86; 277/514

(56) References Cited

U.S. PATENT DOCUMENTS

| | | | | |
|---|---|---|---|---|
| 1,996,779 A | * | 4/1935 | Wheeler | 277/513 |
| 2,045,024 A | * | 6/1936 | Renken et al. | 92/86 X |
| 2,131,927 A | * | 10/1938 | Wenzel | 277/514 |
| 2,898,867 A | * | 8/1959 | Saalfrank | 92/86 X |
| 3,704,652 A | * | 12/1972 | Hoenick | 92/86 X |
| 3,943,717 A | * | 3/1976 | Schnexnayder | 92/86 X |

\* cited by examiner

*Primary Examiner*—John E. Ryznic
(74) *Attorney, Agent, or Firm*—Ronald E. Greigg

(57) ABSTRACT

A pump assembly having a piston pump, which is driven by an eccentric element. To prevent leakage brake fluid from reaching an eccentric element chamber, a groove surrounds the pump piston in the pump housing and a seal and a porous metal sintered ring is inserted into the groove. A drain which extends obliquely downwardly from the groove drains leakage fluid from the sintered ring.

5 Claims, 1 Drawing Sheet

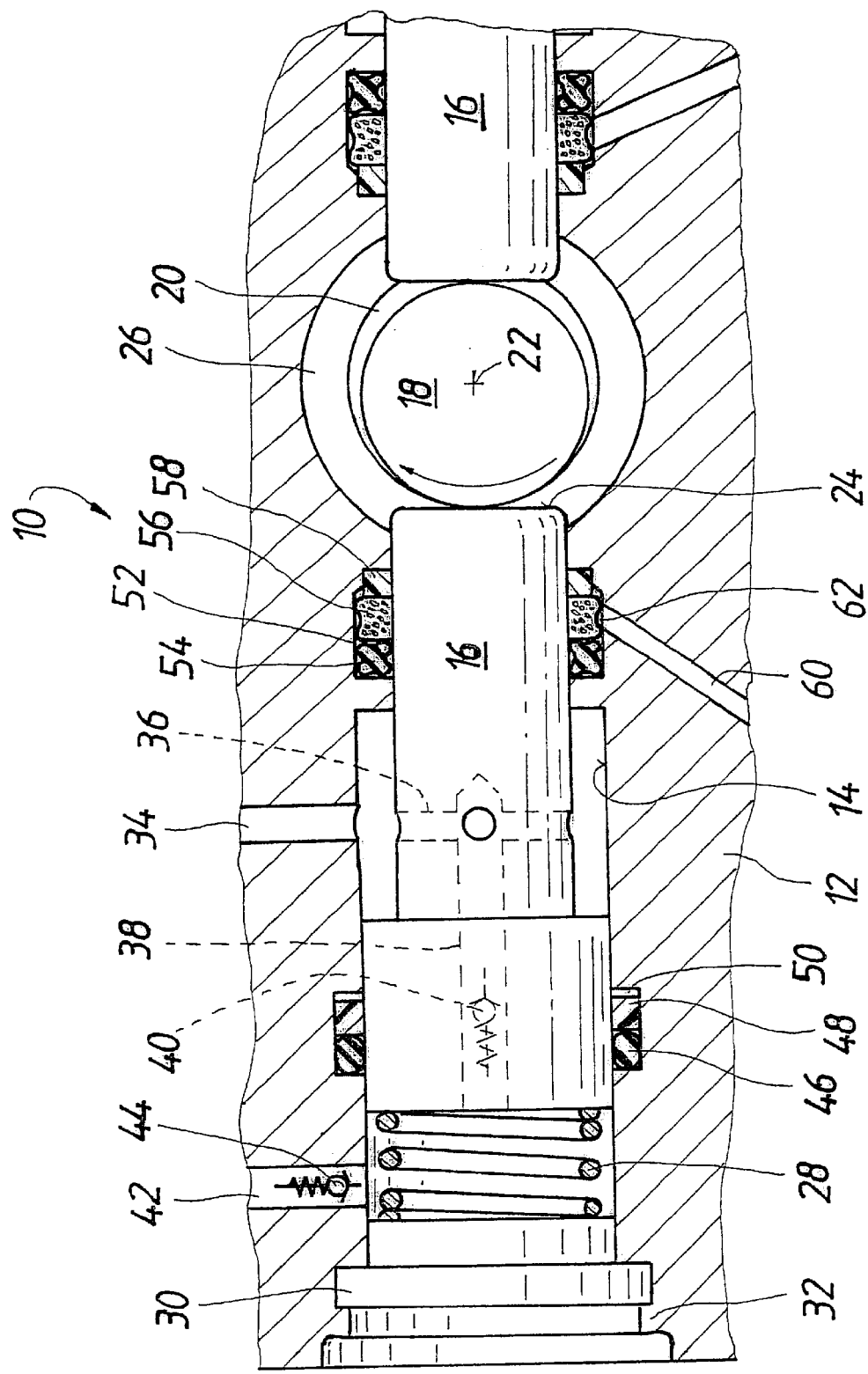

PUMP ASSEMBLY FOR A SLIP-CONTROLLED HYDRAULIC BRAKE SYSTEM FOR A VEHICLE

PRIOR ART

The invention relates to a pump assembly for a slip-controlled hydraulic brake system for a vehicle.

One such pump assembly is known from German Patent Disclosure DE 42 39 361 A1. As its pump motor, the known pump assembly has an electric motor, on whose motor shaft an eccentric element is mounted in a manner fixed against relative rotation. A pump piston of a piston pump of the pump assembly rests with an end face on a circumference of the eccentric element. The pump piston is received axially displaceably in a cylinder bore of a pump housing. The pump piston can be guided axially displaceably in the pump housing directly, or in a bush inserted into the pump housing. When the eccentric element is driven to rotate by the pump motor, the pump piston resting on the circumference of the eccentric element is driven to execute an axially reciprocating stroke motion in the cylinder bore, which in a manner known per se for piston pumps brings about pumping of brake fluid. As the eccentric element, a crank (crankshaft) can for instance also be used, which drives the pump piston via a connecting rod.

The eccentric element is disposed in an eccentric element chamber of the pump housing into which the cylinder bore discharges. The pump motor is mounted on or in the pump housing. The piston pump has a seal toward the eccentric element, near the eccentric element chamber, and this seal is intended to prevent brake fluid, to be pumped by the piston pump, from overflowing into the eccentric element chamber. This seal may have a sealing element, such as a sealing ring, and sealing can also take place directly between the cylinder bore and a circumferential surface of the pump piston without any separate sealing element. This too should be understood by the term "seal" in the sense of the present invention. Despite the seal, brake fluid can flow out of the piston pump as a leakage flow between the cylinder bore and a circumferential face of the pump piston into the eccentric element chamber. On the one hand, because of its stroke motion, the pump piston can pump brake fluid adhering to its circumferential surface past the seal into the eccentric element chamber, in the form of so-called drag flow, and on the other, the sealing action of the seal can lessen over time from wear. To prevent brake fluid from accumulating in the eccentric element chamber, the pump housing of the known pump assembly is provided with a bore as a drain, which leads downward from the eccentric element chamber into the open air. To prevent water from entering, a check valve is disposed in the drain.

The known pump assembly has the disadvantage that the pump assembly additionally requires the check valve, and that the check valve must be inserted into the drain during the assembly of the pump assembly, which means additional assembly effort and expense. Invading dirt can moreover impair the closing function of the check valve.

From German Patent Disclosure DE 197 12 686 A1, a pump assembly of the type described above is known, in which a porous sintered metal body, which is therefore permeable to the brake fluid, is inserted into an opening that forms the drain. This pump assembly has the disadvantage that oil can get into the drain from an eccentric element bearing or motor bearing. This oil lessens the permeability of the sintered metal body and stops up the sintered metal body entirely with time.

The two known pump assemblys both have the disadvantage that leaking brake fluid from the piston pump first gets into the eccentric element chamber before flowing into the drain. From the eccentric element chamber, the brake fluid can reach the eccentric bearing or penetrate into the electric motor. The brake fluid destroys a lubricating film on the bearings, thus leading to their destruction. In the electric motor, the brake fluid can cause a short circuit and thus the destruction of the electric motor.

ADVANTAGES OF THE INVENTION

In the pump assembly according to the invention the drain discharges into the cylinder bore, between the seal toward the eccentric element and the eccentric element chamber. Leaking fluid from the piston pump that has overcome the seal toward the eccentric element flows through the drain out of the cylinder bore before reaching the eccentric element chamber. This prevents leaking fluid from the piston pump from reaching the interior of the eccentric element chamber. As a result, mixing of leaking fluid (brake fluid) with lubricant or bearing oil of an eccentric element bearing or motor bearing, which is highly undesirable, does not occur. Since no leaking fluid from the piston pump reaches as far as the eccentric element chamber, leakage fluid is prevented from reaching an eccentric element bearing or motor bearing or the pump motor. Damage to an eccentric element bearing or motor bearing or the pump motor from brake fluid is thus precluded. Oil from an eccentric element bearing or motor bearing is prevented from reaching the drain and being able to stop up a sintered body that might be present. The drainage of leakage fluid is thus assured permanently.

The pump assembly of the invention is intended in particular as a pump in a brake system of a vehicle and is used to control the pressure in wheel brake cylinders. Depending on the type of brake system, the abbreviations ABS (for anti-lock brake system), TCS (traction control system), ESP (electronic stability program) and EHB (electrohydraulic brake system) are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (TCS or ESP or EHB). The pump is needed in a brake system with wheel slip control (ABS or TCS) and/or a brake system serving as a steering aid (ESP) and/or an electrohydraulic brake system (EHB). With wheel slip control (ABS or TCS), locking of the wheels of the vehicle during a braking event involving strong pressure on the brake pedal (ABS) and/or spinning of the driven wheels of the vehicle in the event of strong pressure on the gas pedal (TCS) can for instance be prevented. In a brake system serving as a steering aid (ESP), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

The disposition of a liquid-permeable ring in a groove surrounding the pump piston in accordance with invention has the advantage that the liquid-permeable ring is disposed on an inner or piston end of the drain and is thus protected against water.

BRIEF DESCRIPTION OF THE DRAWING

The invention will be described in further detail below in terms of a preferably selected exemplary embodiment shown in the drawing. The sole FIGURE shows a pump assembly according to the invention, in a simplified sectional view.

DESCRIPTION OF THE EXEMPLARY EMBODIMENT

The pump assembly according to the invention, identified overall by reference numeral 10, is inserted into a hydraulic block 12 of a slip-controlled hydraulic brake system for a vehicle, not otherwise shown. In the hydraulic block 12, of which for the sake of simplicity the drawing shows only a fraction surrounding the pump assembly 10, there are further hydraulic components, such as magnet valves, hydraulic reservoirs, and damper chambers, which are connected hydraulically to one another and to the pump assembly 10. In a manner known per se, the hydraulic block 12 is connected via a brake line to a brake cylinder, not shown, that is actuatable with a foot-actuated brake pedal or a manual brake lever, and wheel brake cylinders, not shown, are connected to the hydraulic block 12 via brake lines. The hydraulic block 12 forms a pump housing of the pump assembly 10 according to the invention and will hereinafter be called the pump housing.

A continuous cylinder bore 14 is provided in the pump housing 12, and two pump pistons 16 are axially displaceably inserted into the cylinder bore. The pump housing 12 with the cylinder bore 14 and one pump piston 16 each forms a respective piston pump 12, 14, 16. Between the two pump pistons 16, there is an eccentric element 18, which is embodied as a peg and is disposed both eccentrically and integrally on one end of a motor shaft 20. The motor shaft 20 is part of a pump motor embodied as an electric motor, which in the drawing is located behind the plane of the drawing and is therefore concealed by the pump housing 12 and is not visible. The pump motor is secured to the pump housing 12. A pivot axis 22 of the motor shaft 20, which at the same time is the pivot axis 22 of the eccentric element 18, intersects an imaginary axis of the two pump pistons 16 and the cylinder bore 14 at a right angle. The pump pistons 16 are in an opposed cylinder arrangement.

The pump pistons 16 rest with their end faces 24 oriented toward the eccentric element 18 on the circumference of the eccentric element 18. The eccentric element 18 is located in a cylindrical eccentric element chamber 26 in the pump housing 12, into which chamber opposing parts of the two pump pistons 18 protrude with their ends. The cylinder bore 14 discharges into the eccentric element chamber 26 at two diametrically opposed points of the circumference.

On one side, remote from the eccentric element 18, one piston restoring spring 28 each, in the form of a helical compression spring, is inserted into the cylinder bore 14; the springs press the pump pistons 16, on opposed sides, against the circumference of the eccentric element 18. The piston restoring spring 28 is braced against a stopper plug 30, which is inserted into the cylinder bore 14 on a side remote from the eccentric element 18. The stopper plug 30 is held in fluid-tight and pressureproof fashion in the cylinder bore 14 by caulking of the pump housing 12 all the way around at 32.

In the exemplary embodiment shown, the pump pistons 16 are embodied as stepped pistons. Stepped pistons are not absolutely necessary for the invention, however, which can equally be realized in a pump assembly having unstepped pistons (not shown). An inlet bore 34 discharges transversely into the cylinder bore 14 in a middle region of the pump pistons 16. Through the cylinder bore 14, transverse bores 36 mounted crosswise in the pump piston 16 communicate with the inlet bore 34, and an axial blind bore 38 leads from the transverse bores to the face end of the pump piston 16 that is remote from the eccentric element 18 and is oriented toward the stopper plug 30. The pump piston 16 has an integrated inlet valve 40, disposed in its blind bore 38, in the form of a spring-loaded check valve, which for the sake of simplicity is shown as a symbol in the drawing. An outlet bore 42 is provided at the level between the pump piston 16 and the stopper plug 30, crosswise to the cylinder bore 14 in the pump housing 12. An outlet valve 44 embodied as a spring-loaded check valve is inserted into the outlet bore 42 and is again shown as a symbol in the drawing for the sake of simplicity. The inlet valve 40 and the outlet valve 44 control the fluid flow through the piston pump 12, 14, 16 in a manner known per se.

Rotationally driving the motor shaft 20 and the eccentric element 18 integral with the motor shaft causes the two pump pistons 18 to execute a reciprocating stroke motion; as a result brake fluid is aspirated in a manner known per se through the inlet valve 40 and expelled through the outlet valve 44. On its side remote from the eccentric element 18, a sealing ring 46 provides sealing between the intake and pressure sides of the piston pump 12, 14, 16, or in other words between the inlet bore 34 and a pressure chamber into which the piston restoring spring 28 is inserted. A guide ring 46 guides the pump piston 16 axially displaceably in the pump housing 12. The sealing ring 46 and the guide ring 48 are inserted into a common groove 50 in the pump housing 12. On a side toward the eccentric element 18, the pump housing 12 is likewise provided with a groove 52, surrounding the pump piston 16; a sealing ring 54, which seals between the intake side (inlet bore 34) of the piston pump 12, 14, 16 and the eccentric element chamber 26, and a porous metal sintered ring 56 and a support ring 58 are all inserted into this groove. The sealing ring 54 is disposed remote from the eccentric element 18; the support ring 58 is disposed facing toward the eccentric element 18; and the metal sintered ring 56 is disposed between them in the groove 52.

The sealing ring 54 forms a seal on the eccentric element side. The sealing ring 54 serves to seal off the low-pressure side of the piston pump 12, 14, 16 from the eccentric element chamber 26. The support ring 58 is provided as a stripper ring that keeps brake fluid, adhering to the pump piston 16, on the side toward the metal sintered ring 56 and is intended as a guide ring for the pump piston 16. When wear occurs to the support ring 58, the metal sintered ring 56 reinforces the function of guiding the pump piston 58. Optionally, the support ring 58 can also be dispensed with and the guidance of the pump piston 16 can be accomplished by the metal sintered ring 56. The metal sintered ring 56 also serves to divert the brake fluid. Because of its porosity, the metal sintered ring 56 is permeable to brake fluid. Brake fluid (leaking fluid), which because of a dragging action of the pump piston 16 in its reciprocating stroke motion or because of wear or leaking on the part of the sealing ring 54 overcomes the sealing ring 54 in the direction of the eccentric element 18, reaches the inside of the porous metal sintered ring 56, which because of its porosity absorbs the brake fluid and temporarily stores the fluid. Since the metal sintered ring 56 is permeable to the brake fluid, it gives the brake fluid up again, so that the brake fluid enters the groove 52 into which the metal sintered ring 56 is inserted. The metal sintered ring 56 diverts leaking fluid by capillary action. From the groove 52, the brake fluid passes into a bore forming a drain 60, which in an operational, conventional installed position of the pump assembly 10 leads obliquely downward from the groove 52 through the pump housing 12 into the open air.

In order to divert the leaking fluid into the drain 60, the metal sintered ring 56, on its outside circumference, has a channel-like free groove 62, which creates an annular free space, surrounding the metal sintered ring 56, in the groove 52 in the pump housing 12. The free groove 62 brings about free, pressureless diversion of leaking fluid into the drain 60. The free groove 62 prevents a pressure buildup in the outer region of the metal sintered ring 56, for instance by capillary action. The free groove can also be mounted, surrounding the metal sintered ring 56, on the bottom of the groove 52 in the pump housing 12 (an option not shown). The free groove 62 and the drain 60 prevent brake fluid that has escaped from the piston pump 12, 14, 16 at the sealing ring 54 toward the eccentric element from reaching the eccentric element chamber 26, where it could impair the lubrication of the eccentric element 18 or of a bearing of the electric motor and could penetrate the electric motor. Along with a function of collecting and diverting escaping brake fluid, the metal sintered ring 56 also prevents water or dirt from getting into the piston pump 12, 14, 16 or the eccentric element chamber 26.

A so-called wading ability, in other words the ability of a vehicle equipped with the pump assembly 10 of the invention to drive through high water causing the pump assembly 10 to dip into the water, exists. For instance, if the pump assembly 10 dips underwater to a depth of 0.5 m, then the pump assembly 10 is exposed to an overpressure of 0.05 bar. The effect of this overpressure is that air located in the drain 60 is compressed to 95% of its original volume; that is, the water penetrates into the drain 60 to 5% of its length. Thus the water does not even come close to the groove 52 and the metal sintered ring 56.

At the same time, the pump assembly 10 of the invention prevents bearing oil from the electric motor or lubricating oil from the eccentric element 18 from reaching the metal sintered ring 56 and reducing its permeability to brake fluid or stopping up the metal sintered ring 56.

An oblique disposition of the drain 60 also serves the purpose of preventing the invasion of water, since it repels splashing water. The oblique disposition of the drain 60 also lengthens its length, which additionally prevents water from reaching as far as the metal sintered ring 56.

The foregoing relates to a preferred exemplary embodiments of the invention, it being understood that other variants and embodiments are thereof possible within the spirit and scope of the invention, the latter being defined by the appended claims.

What is claimed is:

1. A pump assembly for a slip-controlled hydraulic brake system of a vehicle, comprising a pump motor which drives an eccentric element to rotate in a pump housing, a pump piston which is axially displaceably received in a cylinder bore (14) in the pump housing and is driveable with the eccentric element to execute an axially reciprocating stroke motion in the cylinder bore (14), a seal (54) toward the eccentric element, and a drain (60) for diverting leaking fluid, from the cylinder bore to an outside of the pump housing from between the seal (54) element and the eccentric element (18), the pump housing (12) has a groove (52), disposed on the eccentric element side of the seal (54) and surrounding the pump piston (16), from which groove the drain (60) discharges leakage fluid from the cylinder, and a liquid-permeable ring (56) is inserted into the groove (52) juxtaposed the seal (54).

2. The pump assembly of claim 1, in which the ring (56) comprises a porous material.

3. The pump assembly of claim 1, in which the ring (56) forms a guide element for the pump piston (16).

4. The pump assembly of claim 1, in which a free groove (62) surrounding the ring (56) is provided, in which the free groove (62) discharges leakage fluid into the drain (60).

5. The pump assembly of claim 1, in which the drain (60) is mounted obliquely in the pump housing (12).

\* \* \* \* \*